(12) United States Patent
Schröder et al.

(10) Patent No.: US 7,278,509 B2
(45) Date of Patent: Oct. 9, 2007

(54) COUNTERBALANCED FORKLIFT TRUCK WITH A DEVICE FOR ELECTRO-HYDRAULIC OR ELECTRIC STEERING

(75) Inventors: Henrik Schröder, Winsen-Roydorf (DE); Michael Von Forstner, Schleswig (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 10/980,623

(22) Filed: Nov. 3, 2004

(65) Prior Publication Data

US 2005/0199436 A1    Sep. 15, 2005

(30) Foreign Application Priority Data

Nov. 3, 2003    (DE) ................. 103 51 162

(51) Int. Cl.
*B62D 5/04* (2006.01)
(52) U.S. Cl. .......................... 180/333; 280/89
(58) Field of Classification Search ............... 280/89; 180/333, 402, 403
See application file for complete search history.

(56) References Cited

U.S. PATENT DOCUMENTS

| | | | | |
|---|---|---|---|---|
| 5,181,173 A | * | 1/1993 | Avitan | 701/42 |
| 5,803,202 A | * | 9/1998 | Bohner et al. | 180/443 |
| 6,481,526 B1 | * | 11/2002 | Millsap et al. | 180/402 |
| 6,542,801 B2 | * | 4/2003 | Kawashima | 701/41 |
| 6,896,089 B2 | * | 5/2005 | Mills et al. | 180/402 |
| 6,938,720 B2 | * | 9/2005 | Menjak et al. | 180/402 |
| 2003/0114970 A1 | * | 6/2003 | Hara | 701/41 |
| 2004/0040779 A1 | * | 3/2004 | Bishop | 180/443 |

FOREIGN PATENT DOCUMENTS

| | | |
|---|---|---|
| DE | 10008984 | 8/2001 |
| DE | 10024455 | 11/2001 |
| EP | 0596167 | 5/1994 |
| EP | 0722878 | 7/1996 |

* cited by examiner

*Primary Examiner*—Kevin Hurley
(74) *Attorney, Agent, or Firm*—Vidas, Arrett, Steinkraus (57) ABSTRACT

Counterbalanced forklift truck with a device for an electro-hydraulic or electric steering of at least one wheel of the counterbalanced forklift truck, with a steering wheel, which is pivoted by means of a shaft section about an axis, whereby the maximum steering angle of the steering wheel on each side of a neutral position (straight position) is smaller than 180° and is limited by fixed limit stoppers, the steering transmission ratio is progressive with increasing steering angle of the steering wheel and the steering transmission ratio becomes more indirect with increasing travel speed.

13 Claims, 5 Drawing Sheets

COUNTERBALANCED FORKLIFT TRUCK WITH A DEVICE FOR ELECTRO-HYDRAULIC OR ELECTRIC STEERING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Electric or electro-hydraulic steering devices for industrial trucks have been known for a long time. A steering transmitter is activated by means of a steering wheel or a similar steering element which is operated by the driver and which is pivoted in at least one bearing of the industrial truck by means of a shaft section. The steering transmitter in most cases works electrically and as a rule is a potentiometer. The electrical signals are transmitted to a steering control, which converts the steering wheel angle into a corresponding steering angle of the wheel to be steered. In a hydraulic steering device, for example, a pump is activated which operates by a steering valve on a steering cylinder, which effects the direction the wheels turn.

In connection with such a steering device, it is known from EO 0 596 167 to make the transmission ratio variable between the steering wheel and the steering motor, and in fact dependent on the speed of the industrial truck. Preferably, the higher the speed, the "more indirect" is the steering. Thereby stable handling and smooth travel is maintained. From EP 0 722 878 it is further known not to only change the transmission ratio along a specified characteristic curve dependent on the travel speed, but rather store a set of characteristic curves in a steering device in order to establish the transmission ratio, resp. the transmission characteristic curves, with options, e.g. to adjust according to the experience and ability of the driver. From DE 100 08 984 it is known not to change the steering movement of the steerable wheel dependent only on the travel speed, but also on the mass and/or the lifting height of a load picked up with the industrial truck.

Generally the electro-hydraulic or electric steering systems have considerable advantages. The steering forces are reduced and there is a more free space maintained in the knee area of the driver. Additionally it is possible to continuously adjust the steering ratio during operation with little effort.

SUMMARY OF THE INVENTION

It is an object of the invention to provide a counterbalanced forklift truck with a device for an electro-hydraulic or electric steering of at least one wheel with which the steerability and the safety of the industrial truck is improved.

With the device according to the invention, a steering wheel is used which has only a small maximum steering angle on both sides of the neutral position, whereby the maximum steering angle is limited by fixed limit stoppers. The maximum steering angle is smaller than 180°, preferably about 110° to each side. According to one embodiment of the invention, the steering wheel is pretensioned in the neutral position, preferably with the help of the appropriate springs. Important to the invention is thus the combination of this steering wheel with a speed dependent adjustment of the steering ratio, so that with increasing travel speed the maximum angle of the steered wheels or of the steered wheel is smaller.

For electric or electro-hydraulic steering devices there normally exists a transmission ratio between steering wheel and steering motor. In the invention the steering transmission ratio is progressive, i.e. in the area of the initial position of the steering wheel the steering is relatively soft and becomes harder or more direct with increasing angle of the steering wheel. This is advantageous for strongly constricted turning angles of the steering wheel.

A suitable damper can be attached to the steering wheel: Its effect can advantageously be made dependent on the operating conditions of the vehicle in order to increase its steadiness. Furthermore the steering angle, the yaw rate, the mast height of the load, the weight of the load, the tilt angle of the mast, etc. can have an influence on the damper action in order to ensure safety.

The device according to the invention has advantages. Thus for example, an active strength reaction is not necessary for the driver due to the fixed steering limit stoppers. In addition it doesn't need a steering angle display. The reduced turning movement of the steering wheel improves the manageability when steering. The speed dependent adjustment of the steering transmission ratio increases the safety of the industrial truck at higher speeds. The fixed limit stoppers of the steering wheel in combination with the speed dependent adjustment of the steering transmission ratio increasingly limit the maximum steering angle of the steered wheel with increasing speed. Therefore sharp cornering is avoided, which otherwise increase the danger of turning over. Through the limited turning angle the control elements of the industrial truck can be integrated into the steering wheel and are always still easy to access.

As with known steering devices, according to one embodiment of the invention, it is advantageous if the maximum steering speed dependent on the speed of the industrial truck is changed according to a design of the invention, whereby additional safety in driving operations is maintained.

From DE 100 24 455 A1 a special steering wheel for industrial trucks is known, whose outer contour is approximately triangular with extremely rounded corners, whereby the base section of this triangle is turned toward the driver and in the neutral position of the steering wheel runs crosswise to the viewing direction of the driver. In the side sections which connect the ends of the base section with the peak of the triangle contour, ring shaped control elements are arranged, which are limited in twisting around an axis, which lie approximately along the axis of the corresponding side section. Jumper rings activate the driving control in the known case. The connection of the steering wheel with a shaft section on which a steering angle transmitter also is located, is done with the known steering wheel by a middle spoke, which connects the peak of the triangle contour with approximately the middle of the base section. One embodiment of the invention originates from a similar steering configuration and in addition provides that on the opposite side of the hub of the steering wheel are arranged control elements for the operation of the industrial truck. According to a further embodiment of the invention, key-shaped control elements are provided. As an example these control elements can serve to tilt or push to the side the load-bearing medium in front of the mast of the industrial truck.

With the described design of the invention there are thus control elements integrated into the steering wheel, whereby the ergonomics in regards to the manageability of the industrial truck are improved, which at the same time leads to higher productivity.

According to a further embodiment of the invention a display field or a display is placed in the hub area. Control lamps can be provided in the display field, and in a display different indicators provided for monitoring functions of the industrial truck.

BRIEF DESCRIPTION OF SEVERAL VIEWS OF THE DRAWINGS

The invention is more closely explained in the following based on an exemplary embodiment shown in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 6:
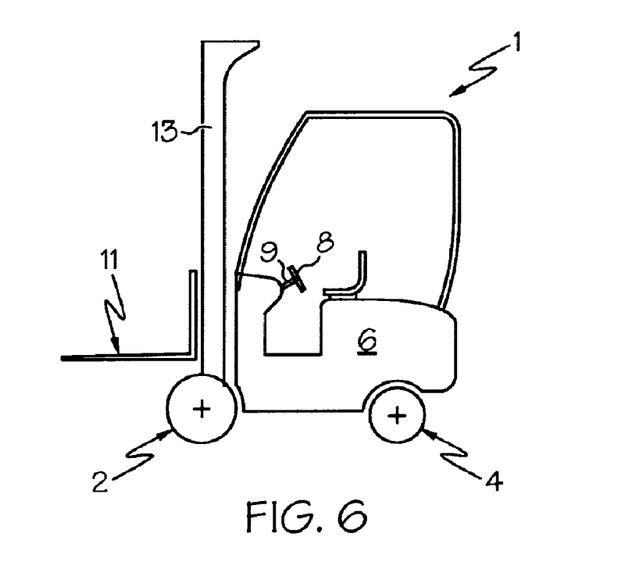
FIG. 6 shows schematically a counterbalance forklift truck in the side view.

FIG. 6 shows very generally a four-wheeled counterweight forklift truck 1, with a pair of front wheels 2 and a pair of rear wheels 4. In the vehicle body 6 are the different aggregates arranged for the operation of the forklift truck 1, e.g. a drive motor for the front wheels 2, a brake mechanism, a steering device which is activated from a steering wheel 8, a drive mechanism for a load fork 11, whose height is adjustable along a mast 13. Details are neither represented nor must they be described because they are generally known.

Figure 1:
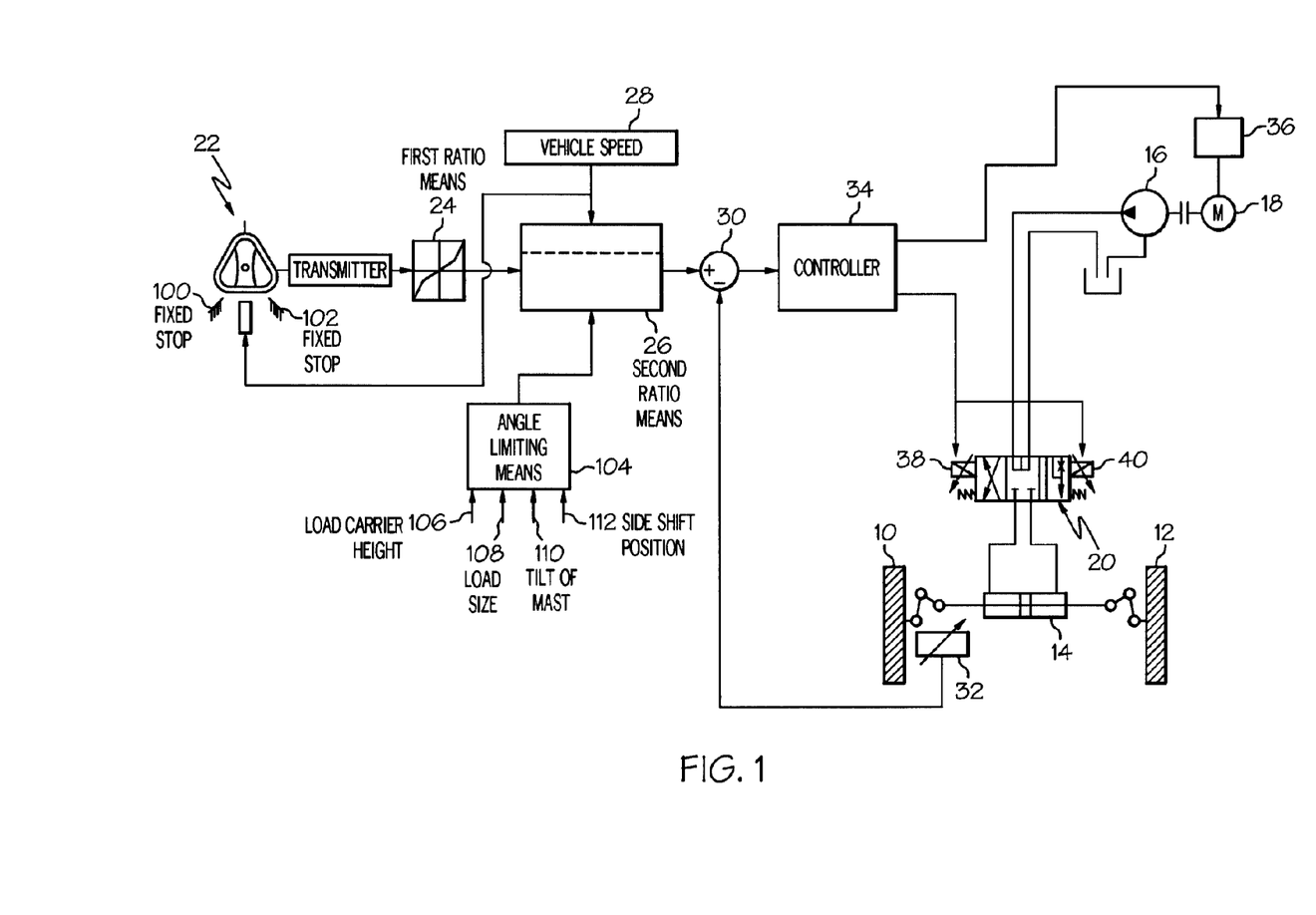
FIG. 1 shows schematically a first embodiment of a steering device according to the invention.

In FIG. 1 two rear wheels 10, 12 of an industrial truck are indicated, for example of the counterbalance forklift truck 1 according to FIG. 6. The wheels 10, 12 are mutually steered with the help of a hydraulic steering cylinder 14. The steering cylinder 14 is supplied by a pump 16, which is driven by a steering motor 18. The pump 16 is connected by an electromagnet-control valve 20 to the steering cylinder 14.

The hydraulic steering device is operated from a steering wheel 22, which is connected with a shaft section, which is not shown, to the industrial truck for the purpose of rotation about an axle, whereby a steering transmitter is coupled with the shaft section, for example a potentiometer, for the purpose of generating an angle dependent steering signal. This signal is given on a progressive steering transmission ratio 24, whose signal is given on a further steering ratio 26, which changes the ratio dependent upon the travel speed. The progressive transmission ratio ensures that with very small steering angles a low response of the steered wheels occurs. The latter is increased with increasing steering angle. The travel speed is given to the variable steering transmission ratio 26 by a velocity probe 28. In a target value-actual value comparison 30, a comparison of the target value coming from the block 26 is made with an actual value which is delivered from a sensor 32 which detected the steering angle of the wheels 10, 12. Corresponding to the standard deviation, a control signal on a position controller 34 goes off, which an input signal for the steering valve 20 generates for the pump motor 18 through a pump motor control 36.

The steering valve 20 is not a simple control valve, but rather it opens proportionally depending on the control signals which are given from the position controller 34 to the associated electromagnets 38 or 40. Thereby the speed of the steering movement of the wheels 10, 12 is influenced.

Figure 3:
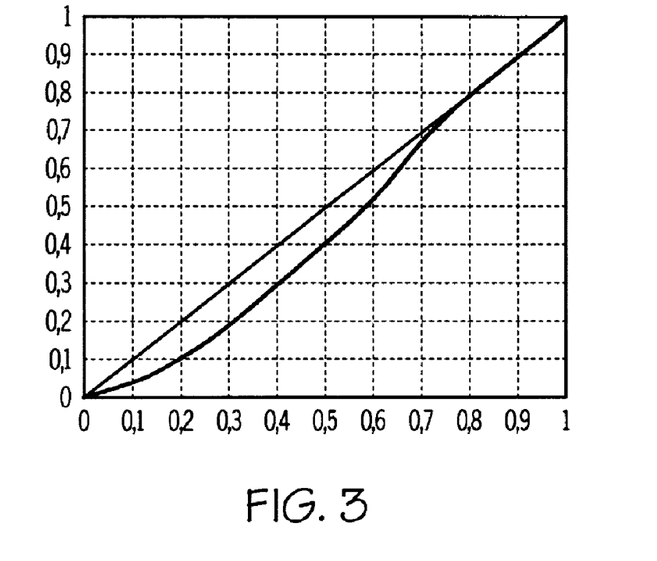
FIG. 3 shows the characteristic curves for the transmission ratio of the steering device according to the invention.

In FIG. 3 the setting range of the steering cylinder 14 according to FIG. 1 is plotted on the ordinate of the diagram and the path of the steering wheel 22 is on the abscissa, each starting from the central position to either side. A solid line is drawn straight, which reproduces a linear ratio between steering wheel 22 and hydraulic steering. Drawn beneath is a progressive characteristic curve which approximately reproduces the characteristic curve which in takes effect in block 24 according to FIG. 1.

Figure 4:
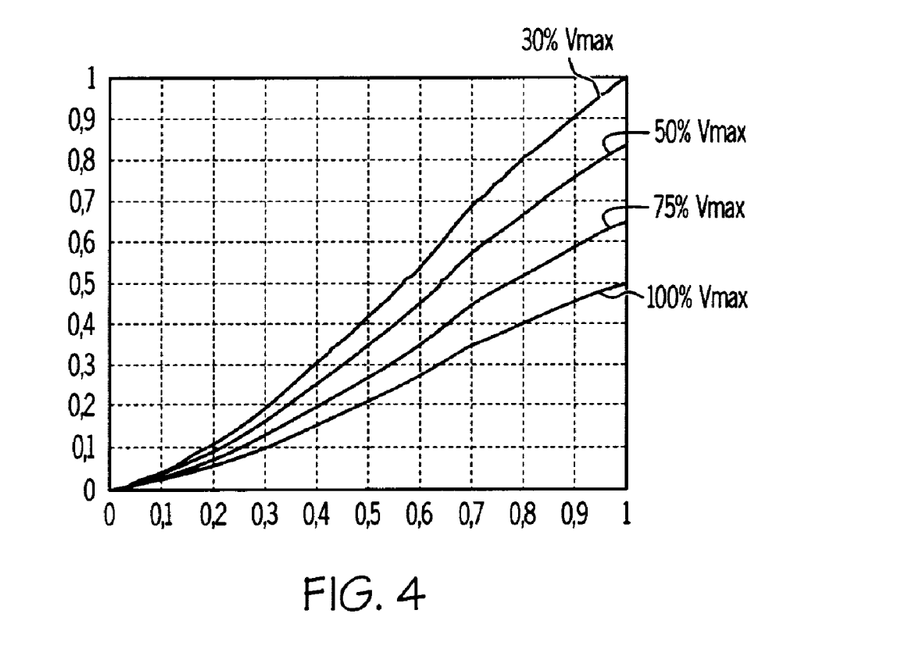
FIG. 4 shows characteristic curves for the limit of the maximum steering angles of steering wheel according to the FIGS. 1 and 2.

The steering wheel 22 according to FIG. 1 has a limited maximum turning angle, preferably 110° to both sides of a neutral position, which corresponds to driving straight. The transmission from the steering wheel to the steered wheels is adjusted with the travel speed. This interrelationship is shown in FIG. 4. On the ordinate is again the setting range of the steering cylinder 14 applied to one side and on the abscissa is the turning angle of the steering wheel 12 to one side. The characteristic curves show the speed dependent steering transmission ratio, whereby the steering angle of the wheels 10, 12 are limited more as the maximum speed becomes higher. The progressive characteristic curve from FIG. 3 is already included in the characteristic curves from FIG. 4.

FIG. 1 also shows fixed stops 100 and 102, which limits the rotation of the steering wheel. FIG. 1 also shows the angle limiting means 104. which in combination the maximum steering angle of the steering wheel with increasing speed. The angle limiting means 104, which limits the steering angle of the steering transmission ratio device, also limits the maximum steering angle depending on the height of the load-carrier (106) the size of the load (108), the tilt of the mast (110) and/or the position of the side shift (112).

Figure 2:
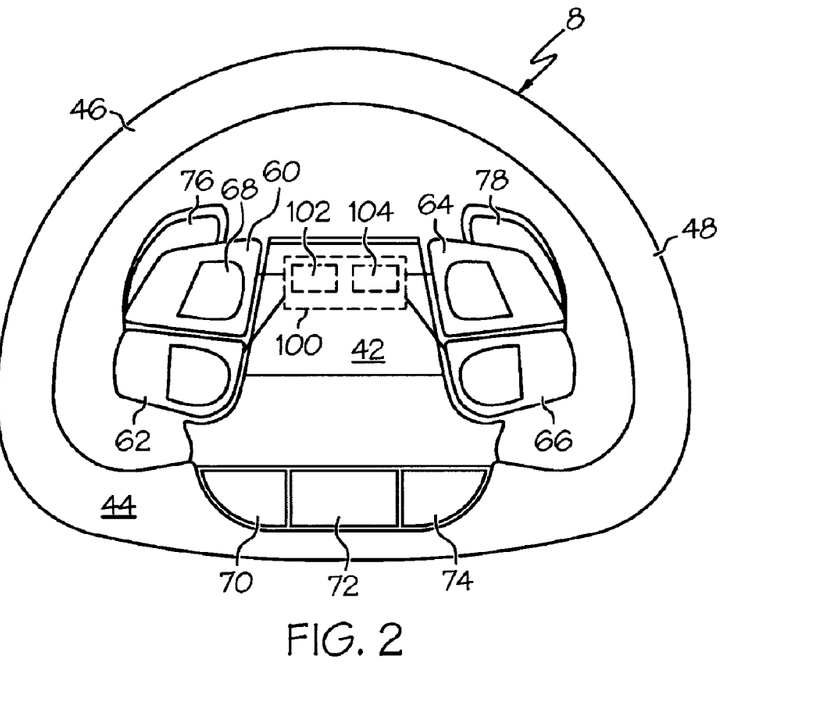
FIG. 2 shows the top view of a steering wheel of the steering device according to the invention.

In FIG. 2 the steering wheel is shown in detail. The steering ring's contour has almost an oval form. A base section 44 of the steering ring, which in the neutral position of the steering wheel 8 extends crosswise to the driver and is facing the driver, is connected in the middle with a hub (not shown) which on its part is connected with a shaft 9 (see FIG. 6). The hub has a hub cover 42. The ends of the base section 44 are rounded into short side sections 46, 48 and these are rounded over into an upper longer section 50. The named sections are lying approximately in one plane. The position of the plane conforms to the seated or standing position of the driver in the driver's cab or resp. in the operator's platform. The profile of the sections 46, 48, of the base section 44 and section 50 is almost circular. The side sections 46, 48 are grip sections, which in the view according to FIG. 2 are gripped from the top and on the sides.

Symmetric to the midplane of the hub cover 42 are arranged on the opposite sides of this two button type control elements 60, 62, and respectively 64, 66 The control elements 60 to 66 have indentations 68 and are thus operated, that the thumb of the band which grips the section 46 or 48, reaches into an indentation 68 and pushes down the corresponding control element. Switching contacts for the control elements and if necessary a switching circuit board 100 can be arranged underneath the cover 42, and connection wires of the control elements 60 to 66 with the appropriate control device are extended, for example, through the shaft 9 of the steering wheel 8 to the corresponding control device in the vehicle body 6 (not shown). Electric switches 102 and potentiometers 104 are shown in FIG. 2 connected with switch circuit board 100 and associated with control elements 60, 62, 64, and 66, under the cover 42.

The control elements 60 to 66 are used for the activation of certain functions of the industrial truck and are preferably continually operable and are for example pretensioned by means of springs in a neutral central position. The push-button 60 is used for example to tilt the mast 13 (FIG. 6). The control element 64 is used for example for lifting and lowering the load fork. A lifting operation is done for example if the control element 64 is pushed from above. A lowering is done if the control element 64 is grasped from below and lifted up. The control element 66 is used for example for the operation of a side shift. A side shift enables a cross position of the load fork 11 relative to the longitudinal axis of the industrial truck 1. The control element 62 can be used for activation of further functions. The upper section of the cover 42 can also be used as a control element for example as a push-button, e.g. for a horn. In the area of the base section 44 are three push-buttons 70, 72 and 74 arranged next to each other. The push-button 70 is used for example for the engagement of a dead slow mode. The push-button 72 is used for example for activation of a parking brake. The push-button 74 is used for activation of a further, not further specified function.

In FIG. 2 on the opposite sides of the cover 42 at a distance from the control elements 60 to 66 are located paddle shaped control elements 76, 78. They are used for presetting the direction of travel of the industrial truck 1. They can either be pressed, for instance with the pointer finger or the thumb of one hand, or pulled in the direction of the associated push-buttons, depending on which direction of travel is chosen.

As already mentioned, all the shown control elements or push-buttons can easily be operated by the driver with the thumb or index finger of one hand, if one or both hands are gripping the sections 46, 48 of the steering ring of the steering wheel 8.

A display can also be located in the area of the cover 42.

Figure 5:
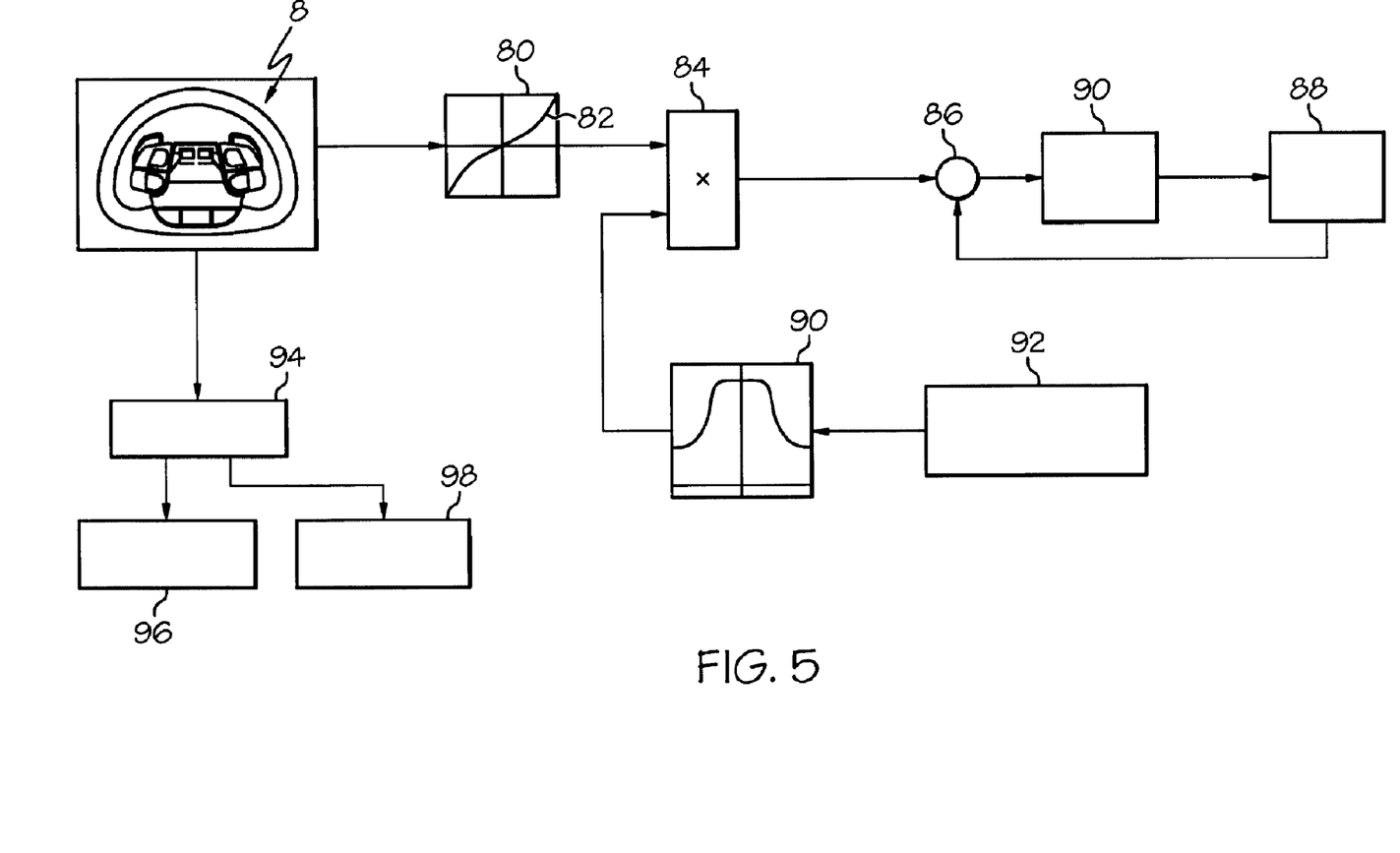
FIG. 5 shows in block diagram a second embodiment of a steering device according to the invention.

In FIG. 5 a block diagram for the operation of the industrial truck according to FIG. 6 is portrayed for the steering and hydraulic servicing functions. One recognizes the steering wheel 8 according to FIG. 2, which corresponding to the turn or angle gives a signal on a transmission ratio block 80, in which a progressive steering characteristic curve 82 is charted. This means that with small steering angles in the area of the neutral position of the steering wheel 8 a relatively small signal is created, which however progressively increases with larger occurring steering angles. The steering is more direct with increasing turning angle of the steering wheel 8. This signal is given to a multiplier 84 whose output signal gives a steering angle target value. This target value arrives on a target-actual value comparison 86, in which a steering angle actual value is also given. In block 88 the adjustment device for the steered wheels is embodied, for example an electric or electro-hydraulic adjustment as was also described in connection with FIG. 1. The actual angle of the wheels is then, as mentioned, given to the target-actual value comparison. The standard tolerance arrives on a position controller 90 for the corresponding adjustment of the steered wheels using a suitable actuator.

In the steering transmission ratio 84 another signal arrives, which comes from a block 90, in which a speed dependent characteristic curve is stored. A travel velocity sensor 92 measures the speed of the industrial truck 1, and a corresponding value from block 90 arrives at the multiplier block 84. Therefore the steering angle target value is dependent on the progressive characteristic curve 82 and a speed dependent factor. The resulting steering transmission ratio for different exemplary travel speeds is shown in FIG. 4, whereby the standardized angle of the steering wheel from the straight position to an angle is charted on the abscissa; the standard angle of the steered wheel from the straight position to a turn is charted on the ordinate. It is apparent that with a high travel speed despite full turn of the steering wheel the steered wheel does not reach the full angle. In this manner the steerability and safety of the vehicle is increased.

The push-buttons 60, 64 and 66 of the steering wheel 8 according to FIG. 2 are used for activation of a hydraulic, for example to activate a lift drive for the load fork 11 according to FIG. 6. In FIG. 5, a block for the lift control 94 is denoted. This is connected with a hydraulic aggregate 96, which includes a motor and a hydraulic pump driven by a motor. Furthermore a control connection to hydraulic valves 98 takes place for the control of lifting and lowering operations as well as further hydraulically operated functions of the industrial truck according to FIG. 6.

The steering wheel 8 is, as previously mentioned, connected with the shaft section 9, which is pivoted in the appropriate bearings of the industrial truck. The shaft section is connected with the hub on the opposite side in FIG. 2 of the steering wheel 8. The individual control elements of steering wheel 8 require electric lines for the connection with the individual functions of the industrial truck. Instead of connecting each of the control elements or push-button elements with a central control using its own line, a CAN bus connection can also be used so that only one bus connection is made in the shaft section. In steering wheel 8 a processor can be integrated to transmit the individual signals from the control elements over the bus to the central control.

It is still to mention, that with the aid of the described steering it is possible to arrange the steering wheel 8 or the shaft section 9 near the middle in the cabin of the forklift truck 1 according to FIG. 6. Due to the electrical transmission of the steering signals the steering requires little space in the cabin. Therefore sufficient space remains, e.g. to the side of the steering wheel 8, to arrange certain operating devices, e.g. an on-board computer or similar.

Figure 7:
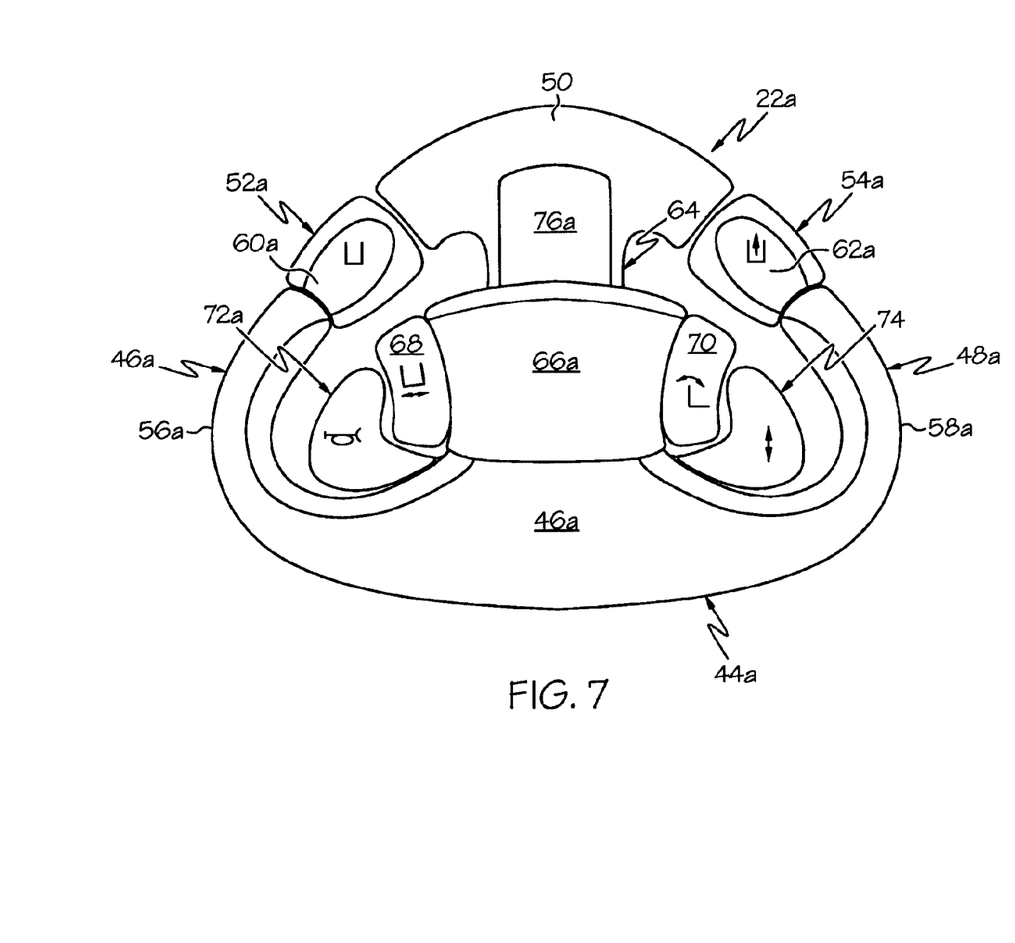
FIG. 7 shows a top view of a further embodiment of a steering wheel according to the invention.

In FIG. 7 is another embodiment of a steering wheel 22*a* shown in detail. It shows in its contour an approximately triangular shape with extremely rounded corners. A base section 44*a*, which in the neutral position of the steering wheel 22*a* extends crosswise to the driver and is facing the driver, has a widened middle section 46*a*. At the ends of both sides the base section 44*a* is increasingly tapered and in connection with the side sections 46*a*, 48*a*, converges to a peak section 50*a*. The named sections lie in approximately one plane. The position of the plane conforms to the seated or standing position of the driver in the driver's cabin or on the operator's platform. The outer contour of the side sections 46a, 48a, of the base section 44a and the peak section 50a is rounded in an arched shape. In the run of the side sections 46a, 48a barrel-shaped control elements 52a, 54a are arranged which can be turned to a limit, which coincide approximately with the axis of the associated side sections 46a, 48a. Below the control elements 52a, 54a, the side sections 46a, 48a form the grip sections 56a, 58a, which are grasped from above and from the side in the view according to FIG. 2, whereby the control elements 52a, 54a can be operated with the thumb which reach in indentations 60a or 62a. The right control element 54a is used for example for lifting and lowering the load-carrier on the mast of the not shown industrial truck. The left control element 52a is used for example for not named additional functions.

A spoke section 64a connects peak section 50a with middle section 46a. The spoke section 64a has a widening 66a near the middle section 46a, which extends into the space which is formed from the side sections 46a, 48a, the base section 44a and the spoke section 64a.

The free ends of the widening 46a are concave shaped. As is recognizable, button-shaped control elements 68a, 70a, are arranged on the free ends of the widening 46a which are located on the widening 66a and in their shape fit into the concave end contour of the widening 66a. Thereby a segment-type configuration results. The control elements 68a, 70a are preferably tiltable, by pressing with a finger either on the upper or lower end. Thereby, by means of the control element 68a a side-shifting of the load-carrier takes place and by activating the control element 70a a tilting of the load-carrier or the associated mast results.

Angular additional control elements 72a, 74a are also found in the space between the side sections 46a, 48a and the spoke 64a. The one side of the control elements 72a, 74a is located on the middle section 46a and the other side extends into the named space approximately parallel to the grip sections 56a, 58a and the control elements 68a, 70a. The control element 72a is used for example for activating a horn and hence only needs to be pushed down with the finger, whereto a swivel bearing on middle section 46a is sufficient. The right control element 74a is used for instance for changing the direction of travel. It is also operated by a push of the finger and leads to reversing the direction of travel. Since it can also be used for inputting the direction of travel, a rocker bearing must be provided so that the respective travel direction input can be carried out.

The installation of the individual control elements 68a to 74a can be carried out by a person skilled in the art in any manner and is therefore not described in detail.

In the area of the peak section 50a a display 76a is found in the spoke section 64a for the indication of different functions of the not shown industrial truck. Only warning and control lamps can also be provided instead of these in the field of the display 76a.

The steering wheel 22a is, as was already mentioned, connected with a shaft section which is pivoted in appropriate bearings of the industrial truck. The shaft section is connected with the spoke section 64a on the opposite side in FIG. 7. The individual control elements of the steering wheel 22a require electric lines for the connection with the individual functions of the industrial truck. Instead of connecting each of the control elements with a central control using its own line, a CAN bus connection can also be provided so that only one bus connection is made in the shaft section. In steering wheel 22a a processor can be integrated to transmit the individual signals from the control elements over the bus to the central control.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed:

1. A counterbalanced forklift truck comprising:
   a driver's cab;
   front and rear wheels, where the rear wheels are steerable;
   a steering wheel in the driver's cab to be turned about an axis and coupled with an electric steering transmitter, the maximum of the steering wheel to both sides of a neutral position is smaller than 180° and is limited by fixed stops, the steering transmitter generating a first steering signal in response to the angle of the steering wheel relative to the neutral position;
   a speed measuring device for the forklift truck which provides a speed signal;
   an electric or electro-hydraulic steering mechanism for the rear wheels to actuate the steerable wheels in response to a position signal generated by a steering control, the steering control being supplied by an input signal which is formed by a comparison of a feedback signal corresponding to the actual angle of the rear steerable wheels and a desired steering signal, and
   a steering transmission ratio device having two ratio means to modify the first steering signal to achieve the desired steering signal, one ratio means effects a progressive characteristic to achieve small steering angles when the steering wheel is rotated in the range about its neutral position, the other ratio means being supplied by the speed signal to modify the first steering signal such that the steering angle decreases with increasing speed so that the maximum steering angle which is reached when the steering wheel is moved against one of the fixed stops is decreased with increasing speed.

2. Forklift truck according to claim 1, wherein the maximum steering angle is approximately 110°.

3. Forklift truck according to claim 1, wherein the steering wheel (8, 22), is biased by means of springs towards the neutral position.

4. Forklift truck according to claim 1, characterized in that the steering wheel is arranged approximately on the middle axis of the forklift truck.

5. Forklift truck according to claim 1, characterized inthatthe steering wheel has an approximate triangular shape with extremely rounded corners, whereby the base section faces the driver and in the neutral position extends almost crosswise to the line of vision of the driver, a middle spoke connected with the shaft section which connects the peak to a middle section of the base section, whereby the side sections connecting with the peakwith the end of the base section has ring-shaped control elements, whose center of rotation falls approximately with the axis of the side sections and on the opposite sides of the middle spoke are arranged control elements for functions of the industrial track, which are mounted either on the middle spoke or on the middle section.

6. Device according to claim 5, characterized in that push-button type control elements are arranged on the ends of a cross extension of the middle spoke.

7. Device according to claim 5, characterized inthatangular control elements (72, 74) are arranged in the space between the middle spoke (64) and the side sections (46, 48), from which on each is mounted a side on the foot of the middle spoke or on the widened middle section (46) of the base section (44), while each of the other sides stretch to the peak (50), approximately parallel to the associated side section (46, 48).

8. Device according to claim 6, characterized in that the free side of the angular control elements lies on the outside of the push-button shaped control elements.

9. Device according to claim 5, characterized in that in the area near the peak of the middle spoke a display field or a display is arranged.

10. A counterbalanced forklift truck comprising:
a driver's cab;
front and rear wheels, where the rear wheels are steerable;
a steering wheel in the driver's cab to be turned about an axis and coupled with an electric steering transmitter, the maximum of the steering wheel to both sides of a neutral position is smaller than 180° and is limited by fixed stops, the steering transmitter generating a first steering signal in response to the angle of the steering wheel relative to the neutral position;
a speed measuring device for the forklift truck which provides a speed signal;
an electric or electro-hydraulic steering mechanism for the rear wheels to actuate the steerable wheels in response to a position signal generated by a steering control, the steering control being supplied by an input signal which is formed by a comparison of a feedback signal corresponding to the actual angle of the rear steerable wheels and a desired steering signal;
a steering transmission ratio device having two ratio means to modify the first steering signal to achieve the desired steering signal, one ratio means effects a progressive characteristic to achieve small steering angles when the steering wheel is rotated in the range about its neutral position, the other ratio means being supplied by the speed signal to modify the first steering signal such that the steering angle decreases with increasing speed so that the maximum steering angle which is reached when the steering wheel is moved against one of the fixed stops is decreased with increasing speed, and
the steering wheel having an approximately oval or triangular steering ring which is connected to a hub which in turn is connected to a bearing shaft section, the hub having a cover on which control elements as push-buttons are mounted and moveable such that they can be operated with the thumb or a finger of a hand which engages the steering ring in the area of a short side section of the steering ring from above or laterally.

11. Forklift truck according to claim 10, wherein two control elements on opposite sides of the cover are arranged approximately symmetrical to the central axis of the steering wheel in its neutral position.

12. Forklift truck according to claim 10, wherein a display is arranged in the center area of the cover.

13. Forklift truck according to claim 10, wherein electric switches or potentiometers which are associated with the control elements are arranged under the cover and the electric switch and potentiometer are connectedwith a switch circuit board under the cover.

* * * * *